United States Patent [19]
Cotton

[11] Patent Number: 5,275,043
[45] Date of Patent: Jan. 4, 1994

[54] POSITIVE DISPLACEMENT FLOWMETER

[76] Inventor: Galen M. Cotton, 2226 Bauer Dr, Houston, Tex. 77080

[21] Appl. No.: 984,176

[22] Filed: Nov. 19, 1992

[51] Int. Cl.$^5$ .............................................. G01F 3/10
[52] U.S. Cl. ..................................... 73/261; 418/191
[58] Field of Search ................... 73/253, 261; 418/191, 418/206

[56] References Cited

U.S. PATENT DOCUMENTS

| | | | |
|---|---|---|---|
| 3,368,403 | 2/1968 | Granberg | 73/253 |
| 3,981,194 | 9/1976 | Blise et al. | 73/253 X |

*Primary Examiner*—Herbert Goldstein
*Attorney, Agent, or Firm*—James L. Jackson

[57] ABSTRACT

A positive displacement flowmeter is provided having a body structure defining a flowmeter measurement chamber within which is rotatably supported a large primary gear rotor and a small secondary gear rotor that have rotor teeth intermeshing with one another and also establishing a limited dynamic flow path with respect to internal wall surface segments of the flowmeter measurement chamber. The flowmeter body defines inlet and outlet passages defining a common center-line that is off-center with respect to the flowmeter chamber and which is located between the axis of rotation of the primary rotor and the limited dynamic flow path that is defined within the housing. The essence of this flowmeter construction rests with the rugged, machined gear pair rotating against a limited dynamic seal path coupled with introducing the fluid stream at an off-center position in relation to the flowmeter body and rotor system. These features result in a flowmeter having extremely efficient dynamic responses to changes in flow rate thus permitting the flowmeter construction to take advantage of the fluid stream dynamic pressures. The body structure, particularly at least one end wall thereof, is provided with aligned elongate grooves which provide the flowmeter construction with hydraulic relief which eliminates hydraulic shock that might otherwise cause pressure loss. Electronic signal output of the flowmeter is provided by a radio frequency sensor which detects movement of metallic markers of the primary rotor hub past a detection point during flowmeter operation.

23 Claims, 3 Drawing Sheets

POSITIVE DISPLACEMENT FLOWMETER

FIELD OF THE INVENTION

This invention relates generally to flowmeters for measuring the volume of fluid flowing through a flow way. More particularly, the present invention is directed to a flowmeter construction for extremely accurate measurement and which incorporates the combined measurement concept of a pelton type flowmeter and a positive displacement flowmeter with the flowmeter mechanism utilizing a radio frequency, noninvasive system for detecting the volume of fluid flow through the flowmeter by the generation of electronic signals in direct proportion to the volume of fluid flow.

BACKGROUND OF THE INVENTION

Various types of flowmeters have been developed over the years for measuring the flow of fluid mediums such as liquids gases, liquid/gas mixtures, slurries, etc. Most flowmeters, such as pelton type or paddle wheel flowmeters are subject to certain inaccuracies depending upon temperature, fluid consistency, turbulence of the flowing fluid and various other factors. Nevertheless, pelton type flowmeters can be appropriately calibrated with respect to the fluid to be measured that measurement of flow can be quite accurate. Positive displacement flowmeters of various types are considered to be quite accurate in comparison with pelton type flowmeters but their accuracy can be subject to deterioration by such factors as pressure loss across the flowmeter rotors, magnetic field induced rotor retardation, etc. It is desirable, therefor, to provide a positive displacement type interengaging rotor flowmeter construction which has very little pressure loss across the rotors and which is not subject to any magnetic retardation.

Another factor that contributes to inaccuracy of dual rotor type positive displacement flowmeters is the presence of hydraulic shock at the rotor interface which contributes to pressure loss and which results in flowmeter inaccuracy. It is desirable, therefor, to provide a positive displacement type flowmeter wherein hydraulic shock across the flowmeter rotors is significantly minimized.

SUMMARY OF THE INVENTION

From the standpoint of intermeshing gear type positive displacement flowmeters, it is typical to locate signal generating elements such as magnets in the respective gear teeth of the flowmeter rotors to thus provide a signal pulse representing the volume of fluid that is conducted through the flowmeter as each rotor tooth passes a sensing point. The number of teeth, and thus the number of magnets or other sensors is typically limited in any flowmeter design because there typically exists an optimum number of teeth for any particular size of flowmeter rotor. If the number of rotor teeth is excessive for the dimension of the rotor flowmeter inaccuracy will result. It is desirable, therefore, to provide a flowmeter rotor design wherein the rotor sensors have little or no relation to the number of teeth of the rotor to thus enable the pulse output of the rotor to be established at an optimum level for extremely accurate sensing and to permit the number of rotor teeth to be optimum for the dimension of the sensor rotor that is utilized.

It is also a feature of this invention to provide a novel positive displacement flowmeter having interengaging gear type rotors each establishing a limited dynamic seal path with respect to the flowmeter body to thus minimize pressure loss between the rotors and the body.

It is an even further feature of this invention to provide a novel positive displacement flowmeter which accomplishes introduction of the fluid stream into the flowmeter measurement chamber at an off-center position in relation to the meter body and rotor system to thus provide efficient dynamic response to changes in the rate of flow.

It is another important feature of this invention to provide a novel positive displacement dual gear rotor type flowmeter incorporating a main drive rotor which is so positioned with respect to the flow stream being introduced into the flowmeter measurement chamber to cause the main rotor to respond to subtle changes in flow rate, thus allowing it to take advantage of the fluid stream dynamic pressures.

Briefly, the various features of the present invention are effectively realized through the provision of a dual gear rotor flowmeter design incorporating a flowmeter body or housing construction which defines an internal measurement chamber and further defines aligned inlet and outlet flow passages which introduce the flow of the fluid to be measured in an off-center relation with respect to the measurement chamber and with respect to a measurement rotor. Though not an absolute requirement of this flowmeter design, the flowmeter body or housing may be of generally cylindrical configuration defining a substantially cylindrical internal measurement chamber and having circular plate like end closures which are disposed in sealing engagement at each end of the flowmeter body. The end closures provide for support and positioning of a pair of flowmeter shafts which are each positioned in off-center relation within the measurement chamber. These rotor shafts establish supporting engagement at each extremity thereof with bearings which are also received within bearing receptacles provided at each end of each of the rotors. Each of the rotors is provided with external gear type teeth which are preferably of involute design, but which may have any other gear type design without departing from the spirit and scope of the invention. The rotor pair includes a main or primary rotor of significantly larger diameter as compared to a secondary or blocking rotor. Each of the rotors is of such dimension and positioning with respect to the flowmeter measurement chamber that the outer periphery thereof defined by the gear teeth, during rotation, pass through a limited dynamic seal path which is defined by a cylindrical surface segment that intersects the inner wall surface of the measurement chamber at spaced locations.

The primary rotor is provided with a plurality of metallic markers which are located in equally spaced relation along a circular line defined at one end of the rotor hub, which circular line is located radially inwardly of the rotor teeth and inwardly of the generally cylindrical outer periphery. The number of metallic markers is independent of the number of gear teeth that are provided at the outer periphery of the rotor hub structure.

The rotors are preferably formed of a material of nonmetallic composition, such as any one of a number of suitable polymer materials or vitreous materials that are resistant to the character of the fluid being measured. Preferably the metallic markers are defined by stainless steel pins such as roll pins which are press-fitted into bores that are drilled or otherwise formed in one end of the primary rotor. Since the number of metallic markers is independent of the number of rotor teeth that are provided on the outer periphery of the hub of the primary rotor, the gear tooth design and spacing can be optimized for efficient movement through a limited dynamic seal path while the number of metallic markers can also be optimized for efficient signal pulse generation for electronic processing. The flowmeter is provided with a radio frequency (RF) system for detecting the movement of each metallic marker past a detection point located near the circle of metallic markers at one end of the primary rotor.

The flowmeter is provided with a radio frequency pickup and preamplifier system which develops an electronic pulse upon movement of each metallic marker past a measurement point. The output of the flowmeter is electrically generated and can be provided as a high resolution sine wave, amplified and modified to produce an input voltage dependent square wave output which is TTL compatible or which is an analog signal that is proportional to the rate of fluid flow through the flow line with which the flowmeter is coupled.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

Figure 1:
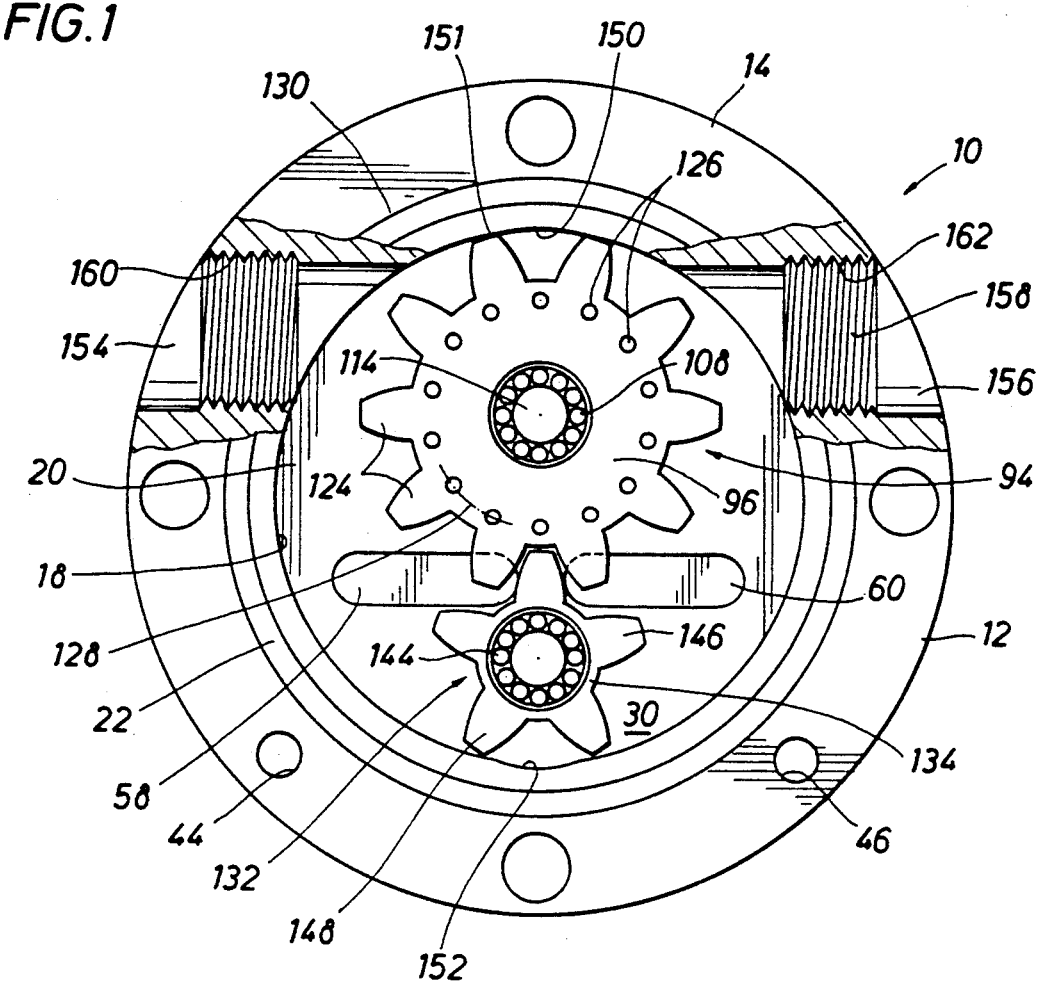

FIG. 1 is an end view of the body portion of a positive displacement flowmeter constructed in accordance with the present invention and being shown with one end closure thereof removed and having parts thereof broken away and shown in section for illustrating the relation of the inlet and outlet flow passages of the flowmeter to the measurement chamber and to the primary and secondary rotors of the flowmeter.

Figure 2:
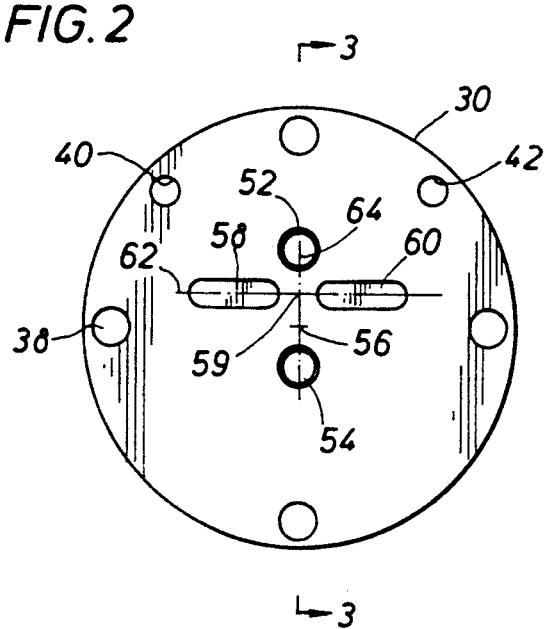

FIG. 2 is an elevational view of one of the end closures of the flowmeter construction.

Figure 3:
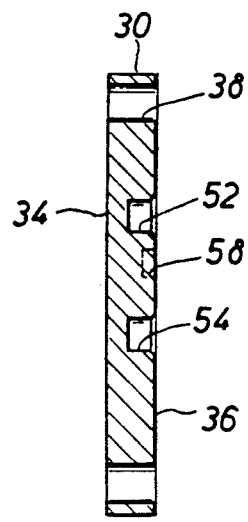

FIG. 3 is a sectional view taken along line 3—3 of FIG. 2.

Figure 4:
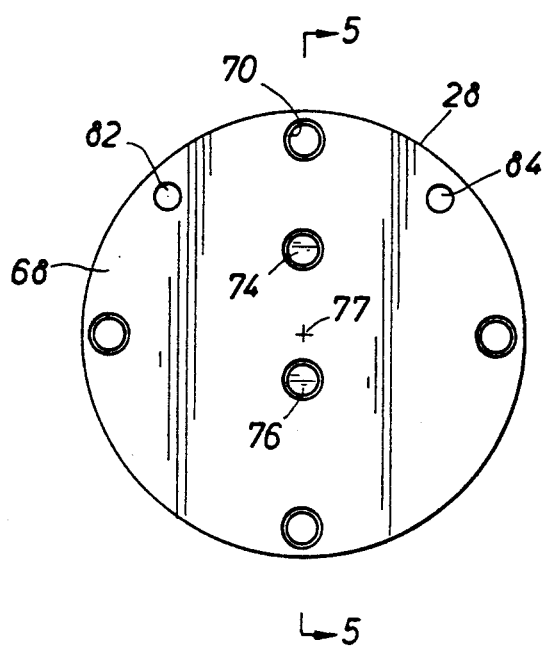

FIG. 4 is an elevational view of the other end closure of the flowmeter housing which cooperates with the housing and with the other end closure to define the flowmeter chamber and to support the rotors for rotation within the flowmeter chamber.

Figure 5:
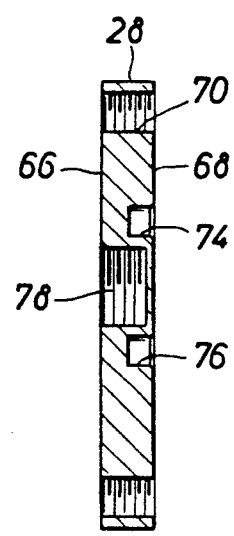

FIG. 5 is a sectional view taken along line 5—5 of FIG. 4.

Figure 6:
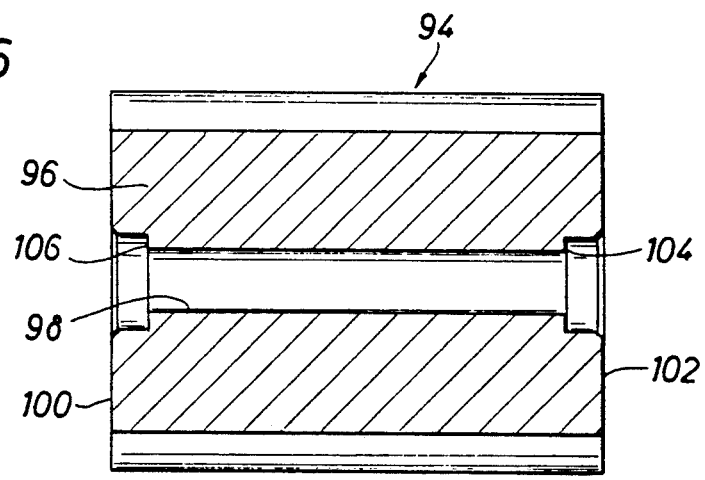

FIG. 6 is a sectional view of the primary rotor of the flowmeter construction of FIGS. 1-5.

Figure 7:
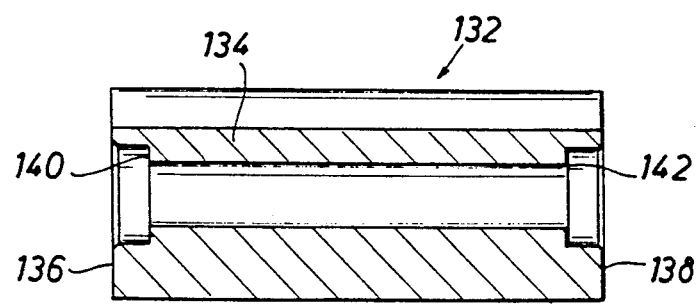

FIG. 7 is a sectional view of the secondary rotor of the flowmeter construction of FIGS. 1-5.

Figure 8:
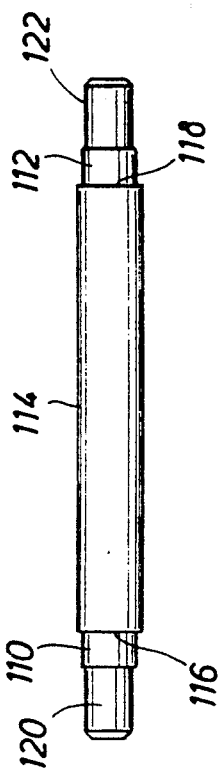

FIG. 8 is a side elevational view of one of the rotor support shafts for supporting the primary and secondary rotors of the flowmeter construction.

Figure 9:
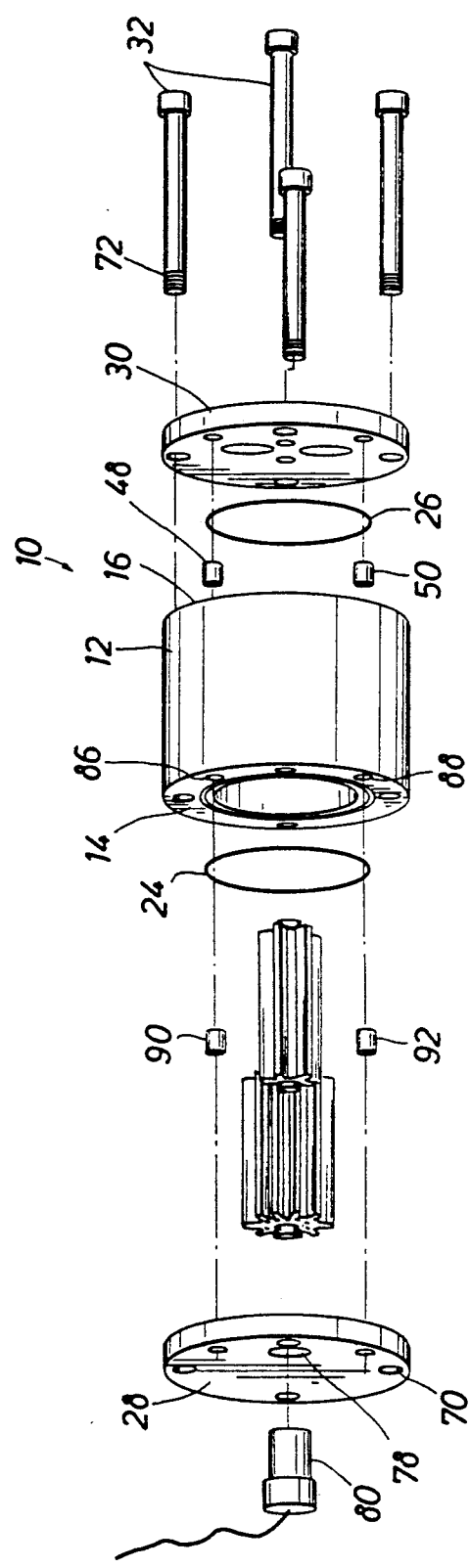

FIG. 9 is an exploded isometric illustration of the flowmeter construction of FIGS. 1-8.

DETAILED DESCRIPTION OF PREFERRED EMBODIMENT

Referring now to the drawings and first to FIG. 1 a positive displacement flowmeter constructed in accordance with the present invention is illustrated generally at 10 and incorporates a body structure 12 which is preferably of generally cylindrical configuration as is more clearly evident from the exploded illustration of FIG. 9 and which defines opposed generally planar, parallel end surfaces 14 and 16. The surfaces 14 and 16 may be circular as shown in the drawings, depending upon the housing construction, or may take any other suitable form without departing from the spirit and scope of this invention. The flowmeter body 12 may define an inner cylindrical wall 18 defining a flowmeter measurement chamber 20. The inner wall 18 of the body 12 may be of generally cylindrical configuration as shown, but may be of any other configuration without departing from the spirit and scope of this invention. Each of the respective ends 14 and 16 of the flowmeter body 12 defines circular seal grooves as shown at 22 which receive circular sealing elements 24 and 26, such as resilient O-rings or the like, which establish sealing between the flowmeter body 12 and a pair of end closures 28 and 30. The end closures are secured in assembly with the body 12 by means of a plurality of bolts 32 which are illustrated in FIG. 9, which extend through bolt holes in one end closure and have threaded ends which are received by internally threaded bolt holes defined by the opposite end closure.

As shown in FIGS. 2 and 3, the end closure 30 is of plate-like construction, being composed of a metal such as stainless steel or any other suitable material. The enclosure 30 defines opposed generally parallel surfaces 34 and 36 and defines a plurality of peripheral bolt openings 38 through which the bolts 32 extend. The enclosure 30 further defines at least one and preferably a pair of locator openings 40 and 42 which are disposed for registry with corresponding locator openings 44 and 46 that are defined at each extremity of the body structure 12. The registering openings 40, 42, 44 and 46 receive alignment pins 48 and 50 as shown in FIG. 9 which establish predetermined alignment of each the end closure relative to the body structure. The end closure 30 also defines a pair of rotor shaft receptacles 52 and 54 which are each positioned in off-center relation to the center point 56 of the end closure. The rotor shaft receptacles 52 and 54 are each defined by blind bores as is evident from FIG. 3, each blind bore be chamfered at its outer portion to permit the end of the rotor shaft to be guided into proper orientation with respect to its receptacle. The enclosure member 30 also defines a pair of elongate hydraulic relief grooves or slots 58 and 60 which are formed along a common slot center-line 62 and are equally spaced with respect to an end closure center-line 64. As shown in broken line in FIG. 3, the hydraulic relief slots 58 and 60 may have a depth substantially less than the depth of the rotor shaft receptacles 52 and 54.

Referring now to FIGS. 4 and 5 the end closure 28 is also of plate-like construction and defines opposed substantially planar surfaces 66 and 68 and defines a plurality of bolt openings 70 which receive the threaded ends 72 of the assembly bolts 32. The bolts 32 secure the end closures 28 and 30 in sealed assembly with the body structure 12 as explained above. The end closure 28 also defines a pair of rotor shaft receptacles 74 and 76 which are similarly oriented and spaced as compared to rotor shaft receptacles 52 and 54 of end closure 30 so that the rotor shafts will be disposed in parallel relation within the measurement chamber 20. The end closure 28 also defines a blind internally threaded receptacle 78 which is adapted to receive an externally threaded radio frequency sensor 80 which is shown in FIG. 9. As is further evident from FIG. 4, the end closure 28 defines alignment bores 82 and 84 which are intended for positioning in registering relation with alignment bores 86 and 88 of the body structure 12. Alignment pins 90 and 92 are received in press fitted relation within the alignment bores 86 and 88 so that the respective alignment pins, like alignment pins 48 and 50, are retained in assembly with the flowmeter body structure 12. Thus, the end closures 28 and 30 can be assembled to the body structure 12 only when the alignment openings thereof are positioned to receive the respective alignment pins of the flowmeter body.

Referring now to FIGS. 1 and 6 the flowmeter construction is provided with a primary rotor shown generally at 94 having a flowmeter hub 96 having a central bore 98 for receiving a flowmeter shaft. The hub construction also defines opposed substantially planar end surfaces 100 and 102 and defines opposed bearing receptacles 104 and 106 which are each concentric with the bore 98 and adapted to receive bearings 108 as shown in FIG. 1. The bearing receptacles 104 and 106 are appropriately sized with respect to the bearings such that the outer race portion of the bearings is press fitted therein, thus retaining the bearings in substantially fixed assembly with the rotor. The respective inner bearing races of the bearing assemblies 108 are disposed in press-fitted or precision fitting relation with respect to bearing support segments 110 and 112 of a rotor shaft 114 as is evident from FIG. 8. The rotor shaft defines bearing support shoulders 116 and 118 against which the inner bearing races of the bearing assemblies are seated. The rotor shaft 114 also defines reduced diameter end sections 120 and 122 which are dimensioned to be received in tight fitting engagement within the respective bearing receptacles 74 and 76 of end closure 28 and 52 and 54 of the end closure 30. Thus, when the end closures are in assembly with the body structure 12, the bearing shaft 114 will be precisely located within the flowmeter measurement chamber 20 and with the bearing assemblies 108 will provide precision rotary support for the primary rotor 94.

At the outer periphery of the generally cylindrical rotor hub 96 is provided a plurality of gear type rotor teeth 124 which are shown to be of involute design but which may have any other suitable design without departing from the spirit and scope of the invention. The rotor teeth 124 are preferably formed integrally with the rotor hub 96 but, if desired, may be affixed to the hub structure in any suitable manner.

At one end of the hub 96 is provided a plurality of evenly spaced metallic marker elements 126 which are oriented in evenly spaced relation along the length of a circular line 128 located radially inwardly of the outer periphery 130 of the hub and thus also located radially inwardly of the plurality of gear type teeth 124 of the primary rotor. The metallic marker elements 126 may take the form of a plurality of small pins such as roll pins that are press fitted within evenly spaced bores that are drilled or otherwise formed in one end portion of the rotor 94. These metallic markers may be composed of stainless steel or any other suitable material that can be efficiently detected by a radio frequency detection system and which is compatible with the fluid medium that is intended to flow through the flowmeter.

Within the flowmeter measurement chamber 20 is also disposed a secondary rotor shown generally at 132 and which incorporates a smaller rotor hub 134 as compared with hub 96 of the primary rotor. The rotor hub 134 defines opposed end surfaces 136 and 138 of substantially planar configuration and also defines opposed bearing receptacles 140 and 142 within which are received bearing assemblies 144 which may be identical with the bearing assemblies 108 of the primary rotor. The bearing assemblies provide precision rotatable support of the secondary rotor 132 about a rotor shaft 146 which may, if desired, be identical with the rotor shaft 114 of the primary rotor. Externally of the rotor hub 134 is provided a plurality of gear teeth 148 which may be formed integrally with the hub or which may be connected to the hub in any suitable manner. Like the teeth 124 of the primary rotor 94, the gear type teeth 148 may be of involute design, or if desired, may be of any other suitable design.

It is desirable to establish a limited dynamic seal path between the respective primary and secondary rotors and the internal wall surface of the flowmeter measurement chamber 20 to provide the rotors with superior dynamic response but significantly minimizes pressure loss. This feature is accomplished by providing a pair of opposed arcuate surfaces 150 and 152 and being segments of a cylinder. The arcuate or cylindrical surface segment 150 is of a configuration and dimension with respect to the axis of rotation of the primary rotor so that the outer surfaces 151 of the respective gear teeth 124 will move into very close fitting relation with the surface 150 during rotation of the rotor. The cylindrical surface segment 150 is disposed to intersect the inner cylindrical wall 18 of the housing structure along lines radiating from the axis of rotation of the primary rotor and being substantially the same lines that occur as the radius of the rotor, defined by the outer extent of travel of the rotor teeth intersect the inner cylindrical wall surface 18. Thus, the cylindrical surface segment 150 is defined as a depression within the inner cylindrical wall surface 18.

The secondary rotor 132 is also provided with a limited dynamic seal path with respect to the inner wall surface of the flowmeter body 14. This dynamic seal path is defined by the cylindrical wall surface segment 152 which is formed about the axis of rotation of the secondary rotor. The wall surface 152 is only very slightly larger in dimension as compared to the outer dimension established by the various gear teeth 48. Thus, both the primary and secondary rotors establish limited dynamic seal paths with respect to the inner wall surface of the flowmeter measurement chamber 20.

The flowmeter rotors 94 and 132 are also rotatably supported by their respective rotor shafts such that the gear teeth 124 and 148 thereof are disposed in intermeshing relation as is evident from FIG. 1. The wall structure 59 that is disposed between the elongate relief slots 58 and 60 is positioned in quite closely spaced relation with the end surfaces of the rotors 94 and 132, thus providing for a dynamic fluid seal between the rotors and the end wall 30.

The body structure 12 of the flowmeter defines inlet and outlet passageways 154 and 156 respectively which define a common center-line 158. The inlet and outlet passages are internally threaded as shown at 160 and 162 to thereby permit flow conduits to be threadedly assembled to the flowmeter body structure. The common center-line 158 of the inlet and outlet passages is located between the axis of rotation of the primary rotor 94 and the limited dynamic seal path that is defined by the cylindrical surface segment 150. Thus the flow path to and from the measurement chamber 20 is off-center or above-center and thus permits the primary rotor to respond efficiently to subtle changes in the flow rate of the flowing fluid and allows the primary rotor to take advantage of the fluid stream dynamic pressures. This results not only in a superior dynamic response but in substantially reduced pressure losses, thus providing the flowmeter with of exceptional accuracy. The limited seal path design feature, coupled with introducing the fluid stream at an off-center position in relation to the flowmeter body and primary rotor has produced a meter with extremely accurate dynamic response to changes in rate of flow.

This flowmeter construction operates on the principle of positive displacement. Simply stated, this is the process of dividing the fluid stream into packets of known volume, counting those packets electronically, and returning them to the fluid stream. This is accomplished dynamically through the rotating gear-type rotors and the pockets that exist between the rotor teeth. As the rotor gears of the flowmeter rotate in response to pressure differential across the flowmeter, which causes fluid flow, fluid is trapped in the open spaces between the gear teeth and between the gear teeth and the wall surface of the flowmeter chamber. These "packets" of fluid are trapped in these open spaces and held captive by the flowmeter body as they impart rotary motion to the rotors. In effect, as the rotor gears are rotated, fluid is "positively displaced" from the moving fluid stream, counted electronically, and then returned to the fluid stream just prior to discharge from the flowmeter.

These volumetric flow measuring devices produce output signals that are directly proportional to the rate of flow of the fluid being measured. The output of this flowmeter is electrically generated and can be provided as a high resolution sine wave, amplified, and modified to produce an input voltage dependent square wave which is TTL compatible or as an analog signal that is proportional to flow rate. All meter adjustment and calibration is accomplished through meter factor adjustment in the instrument receiving the meter output signal. The primary meter output signal is a TTL compatible electronic pulse that is amplified and shaped by a meter mounted electronic preamplifier. This square wave pulse can be transmitted directly to flow computers, digital processors, totalizing and matching counter assemblies as well as a host of control instrumentation. Each signal pulse is generated by a radio frequency generator in response to the movement of one of the metallic markers of the flowmeter hubs past a detection point that is established by an RF sensor. According to the construction shown in FIG. 1 of the drawings the primary rotor is provided with ten rotor teeth or gear teeth. The rotor is also provided with fifteen metallic markers 126. Also, for each rotation of the primary rotor, the fluid passing through the flowmeter is divided into ten fluid segments. Thus, for each ten fluid segments a single revolution of the primary rotor generates fifteen electronic pulses for processing. This feature permits the flowmeter design to be provided with a primary rotor having an optimum number of gear teeth for efficient positive displacement measuring of the flow that is separated from the flow stream. At the same time, the number of electronic pulses per primary rotor revolution can be established at any number that is efficient for electronic processing.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A positive displacement flowmeter, comprising:
   (a) housing means having opposed generally parallel ends and having therein a generally cylindrical flow chamber defining a central axis and having inlet and outlet passages for conducting fluid flow to and from said flow chamber said inlet and outlet passages defining a common center-line;
   (b) a pair of end closures for closing respective ends of said flow chamber, said end closures being oriented in normal relation with said central axis and being disposed in sealed relation with said opposed ends of said housing means;
   (c) a first rotor being mounted for rotation within said flow chamber and defining a rotor hub having an axis of rotation being located between said central axis and said common center-line;
   (d) a plurality of equally spaced gear teeth of involute design being located at the outer periphery of said rotor hub;
   (e) a plurality of equally spaced metallic marker elements being supported by said rotor hub and being located radially inwardly of said gear teeth;
   (f) a blocking rotor of smaller diameter as compared to the diameter of said first type rotor being mounted for rotation within said flow chamber, said blocking rotor having a plurality of integral gear teeth of involute design being disposed in meshing relation with said gear teeth of said first rotor; and
   (g) radio frequency signal generating means being connected to said housing means and located externally of said flow chamber and generating an electronic signal responsive to detecting movement of said metallic marker elements relative thereto, whereby upon a single rotational movement of said pelton rotor said signal generating means generating an electronic signal for each of said metallic marker elements, said electronic signals being directly proportional to the rate of fluid flow through said flowmeter.

2. The positive displacement flowmeter of claim 1, wherein:
   said blocking rotor having an axis of rotation being disposed in parallel relation with said axis of rotation of said first rotor and said central axis and being located opposite said central axis from said axis of rotation of said pelton rotor.

3. The positive displacement flowmeter of claim 1, wherein:

said housing means defines opposed partially cylindrical internal wall surfaces each having close fitting relation with respective ones of said first rotor and said blocking rotor.

4. The positive displacement flowmeter of claim 3, wherein:

said housing means defines a cylindrical internal wall surface of larger dimension as compared with said opposed partially cylindrical wall surfaces and intersecting each of said opposed partially cylindrical wall surfaces.

5. The positive displacement flowmeter of claim 1, wherein:

(a) a pair of rotor shafts being supported in parallel relation within said housing means and defining said axes of rotation for said first rotor and said blocking rotor; and (b) bearing means providing rotatable support for said first rotor and said blocking rotor on respective ones of said rotor shafts.

6. The positive displacement flowmeter of claim 5, wherein said bearing means for each of said first rotor and said blocking rotor comprises:

a pair of spaced bearing elements each being disposed in fixed relation to opposite end portions of said rotor and receiving said rotor shaft in rotatable relation thereon.

7. The positive displacement flowmeter of claim 6, wherein said housing means comprises:

(a) an annular housing body defining opposed ends;

(b) a pair of end closure elements each being disposed in sealed relation with said housing body, said end closure elements each defining a pair of shaft recesses; and (c) said rotor shafts each having opposed ends being received within respective ones of said shaft recesses.

8. The positive displacement flowmeter of claim 1, wherein:

(a) said housing means defines an internal wall surface forming said cylindrical flow chamber; and (b) said inlet and outlet flow passages define a common center-line being located in perpendicular relation with said axes of rotation of said first rotor and said blocking rotor and being further located between said axis of rotation of said first rotor and said internal wall surface of said housing means.

9. The positive displacement flowmeter of claim 1, wherein said housing means comprises:

(a) a housing body defining opposed ends and having end walls defining closures for said opposed ends, said housing body and said end walls cooperatively defining said flow chamber; and (b) at least one of said end walls defining at least one recess therein providing hydraulic relief for minimizing application of hydraulic shock of the flowing fluid to said first and blocking rotors.

10. The positive displacement flowmeter of claim 9, wherein:

said at least one of said end walls defines a pair of spaced elongate recesses located along a common recess center-line, between said spaced elongate recesses said at least one of said end walls defining a generally planar wall surface being located at the region of gear teeth intermeshing of said first and blocking rotors.

11. The positive displacement flowmeter of claim 1, wherein said first and blocking rotors each comprise:

a rotor body having a length exceeding the diameter established collectively by said rotor hub and said gear teeth thereof.

12. A positive displacement flowmeter, comprising:

(a) housing means having opposed ends and defining a flow chamber having a central axis and having inlet and outlet passages for conducting fluid flow to and from said flow chamber, said inlet and outlet passages defining a common center-line;

(b) a first rotor being mounted for rotation within said flow chamber and defining a rotor hub having an axis of rotation being located between said central axis and said common center-line;

(c) a plurality of equally spaced gear teeth being located at the outer periphery of said rotor hub;

(d) a plurality of equally spaced metallic marker elements being supported by said rotor hub of said first rotor and being located radially inwardly of said gear teeth;

(e) a second rotor of smaller diameter as compared to the diameter of said first rotor being mounted for rotation within said flow chamber, said second rotor having a plurality of integral gear teeth being disposed in meshing relation with said gear teeth of said first rotor; and (f) signal generating means being connected to said housing means and located externally of said flow chamber and generating an electronic signal responsive to detecting movement of said metallic marker elements relative thereto, whereby upon a single rotational movement of said first rotor said signal generating means generating an electronic signal for each of said metallic marker elements, said electronic signals being directly proportional to the rate of fluid flow through said flowmeter.

13. The positive displacement flowmeter of claim 12, wherein:

said second rotor has an axis of rotation being disposed in parallel relation with said axis of rotation of said first rotor and said central axis and being located opposite said central axis from said axis of rotation of said first rotor.

14. The positive displacement flowmeter of claim 12, wherein:

said housing means defines opposed partially cylindrical internal wall surfaces each having close fitting relation with respective ones of said first rotor and said second rotor.

15. The positive displacement flowmeter of claim 14, wherein:

said housing means defines a cylindrical internal wall surface of larger dimension as compared with said opposed partially cylindrical wall surfaces and intersecting each of said opposed partially cylindrical wall surfaces.

16. The positive displacement flowmeter of claim 12, wherein:

(a) a pair of rotor shafts being supported in parallel relation within said housing means and defining said axes of rotation for said first rotor and said second rotor; and (b) bearing means providing rotatable support for said first rotor and said second rotor on respective ones of said rotor shafts.

17. The positive displacement flowmeter of claim 16, wherein said bearing means for each of said first rotor and said second rotor comprises:
   a pair of spaced bearing elements each being disposed in fixed relation to opposite end portions of said rotor and receiving said rotor shaft in rotatable relation thereon.

18. The positive displacement flowmeter of claim 17, wherein said housing means comprises:
   (a) an annular housing body defining opposed ends;
   (b) a pair of end closure elements each being disposed in sealed relation with said housing body, said end closure elements each defining a pair of shaft recesses; and
   (c) said rotor shafts each having opposed ends being received within respective ones of said shaft recesses.

19. The positive displacement flowmeter of claim 12, wherein:
   (a) said housing means defines an internal wall surface forming said cylindrical flow chamber; and
   (b) said inlet and outlet flow passages define a common center-line being located in perpendicular relation with said axes of rotation of said first rotor and said second rotor and being further located between said axis of rotation of said first rotor and said internal wall surface of said housing means.

20. The positive displacement flowmeter of claim 12, wherein said housing means comprises:
   (a) a housing body defining opposed ends and having end walls defining closures for said opposed ends, said housing body and said end walls cooperatively defining said flow chamber; and
   (b) at least one of said end walls defining at least one recess therein providing hydraulic relief for minimizing application of hydraulic shock of the flowing fluid to said first and second rotors.

21. The positive displacement flowmeter of claim 20, wherein:
   said at least one of said end walls defines a pair center-line, between said spaced elongate recesses said at least one of said end walls defining a generally planar wall surface being located at the region of gear teeth intermeshing of said first and second rotors.

22. The positive displacement flowmeter of claim 12, wherein said first and second rotors each comprise:
   a rotor body having a length exceeding the diameter established collectively by said rotor hub and said gear teeth thereof.

23. A positive displacement flowmeter, comprising:
   (a) housing means having curved internal wall surface defining a flow measurement chamber and further defining first and second depressions intersecting said curved internal wall surface, said opposed depressions each defining limited opposed dynamic seal paths, said housing having inlet and outlet passages for conducting fluid flow to and from said flow chamber;
   (b) a fluid measurement rotor being mounted for rotation within said flow chamber and defining a plurality of equally spaced gear teeth that move into substantially sealing proximity with said dynamic seal path of said first depression as said fluid measurement rotor is rotated by fluid flowing through said fluid measurement chamber;
   (c) a blocking rotor of smaller diameter as compared to the diameter of said fluid measurement rotor and being mounted for rotation within said flow chamber, said blocking rotor having a plurality of gear teeth being disposed in meshing relation with said gear teeth of said fluid measurement rotor and moving into substantially sealed relation with the other of said dynamic seal paths of said second depression during rotation of said blocking rotor;
   (d) a plurality of equally spaced metallic marker elements being supported by said fluid measurement rotor with the spacing therebetween defining increments of rotation of said fluid measurement rotor; and
   (e) means generating an electronic signal responsive to each increment of rotational movement of said fluid measurement rotor whereby upon a single revolution of said fluid measurement rotor a plurality of electronic signals are generated, said electronic signals being directly proportional to the rate of fluid flow through said flowmeter.

* * * * *